(12) United States Patent
Kim

(10) Patent No.: US 8,621,633 B2
(45) Date of Patent: Dec. 31, 2013

(54) MOBILE TERMINAL TO PREVENT VIRUS INFECTION AND METHOD OF CONTROLLING OPERATION OF THE MOBILE TERMINAL

(75) Inventor: Tae Yong Kim, Seoul (KR)

(73) Assignee: LG Electronics Inc., Seoul (KR)

(*) Notice: Subject to any disclaimer, the term of this patent is extended or adjusted under 35 U.S.C. 154(b) by 534 days.

(21) Appl. No.: 12/547,034

(22) Filed: Aug. 25, 2009

(65) Prior Publication Data

US 2010/0058470 A1 Mar. 4, 2010

(30) Foreign Application Priority Data

Sep. 2, 2008 (KR) ........................ 10-2008-0086445

(51) Int. Cl.
*G06F 21/00* (2013.01)

(52) U.S. Cl.
USPC .......................................................... 726/24

(58) Field of Classification Search
USPC ................................ 726/22, 23, 24; 715/769
See application file for complete search history.

(56) References Cited

U.S. PATENT DOCUMENTS

| | | | | |
|---|---|---|---|---|
| 6,411,693 | B1* | 6/2002 | McKeeth | 379/130 |
| 7,818,807 | B1* | 10/2010 | McCorkendale et al. | 726/24 |
| 8,161,400 | B2* | 4/2012 | Kwon | 715/769 |
| 2006/0084428 | A1* | 4/2006 | Lee | 455/423 |
| 2006/0161988 | A1* | 7/2006 | Costea et al. | 726/25 |
| 2007/0043819 | A1* | 2/2007 | Katagishi et al. | 709/206 |
| 2007/0123214 | A1* | 5/2007 | Mock | 455/410 |
| 2009/0019388 | A1* | 1/2009 | Zhang et al. | 715/772 |
| 2009/0187992 | A1* | 7/2009 | Poston | 726/24 |
| 2009/0282485 | A1* | 11/2009 | Bennett | 726/24 |

OTHER PUBLICATIONS

Cheng, "Smartsiren:Virus Detection and Alert for Smartphones", 11-14, 2007, Pp. 258-271 http://dl.acm.org/citation.cfm?id=1247690.*
Cheng, "Smartsiren:Virus Detection and Alert for Smartphones", 11-14, 2007, pp. 258-271 http://dl.acm.org/citation.cfm?id=1247690.*
Intego, "Intego VirusBarrier X5 User's Manual", 2008, pp. 1-74 http://web.archive.org/web/20080610122833/http://www.intego.com/services/manuals.asp.*
Yap et al., "A mobile phone malicious software detection model with behavior checker", 2005, pp. 57-65, http://link.springer.com/content/pdf/10.1007%2F11527725_7.pdf.*
Song et al., "A System Approach for Cell-phone Worm Containment" 2008, pp. 1083-1084 http://wwwconference.org/www2008/papers/pdf/p1083-liang.pdf.*
European Search Report for Application No. 09010881.2 dated Jun. 21, 2010.

(Continued)

*Primary Examiner* — Kaveh Abrishamkar
*Assistant Examiner* — Carlos M De Jesus, Jr.
(74) *Attorney, Agent, or Firm* — KED & Associates LLP

(57) ABSTRACT

A mobile terminal and a method of controlling operation of the mobile terminal may be provided that include outputting a sensing signal corresponding to a detected attempt to make a call, connecting the call when user input indicates that it is allowed to connect the call, and if the user input indicates that it is not allowed to connect the call, shutting down the detected attempt. Accordingly, suspicious operation that may have been caused by a virus may be shut down to prevent damage to a mobile terminal caused by a virus.

8 Claims, 10 Drawing Sheets

(56) References Cited

OTHER PUBLICATIONS

Teck Sung Yap et al.; "A Mobile Phone Malicious Software Detection Model with Behavior Checker;" Aug. 23, 2005, Web and Communication Technologies and Internet Related Social Issues, Springer-Verlag, Berlin/Heidelberg, pp. 57-65.

Liang Zie et al.; "A Systematic Approach for Cell-phone Worm Containment;" Proceedings of the 17$^{th}$ International Conference on World Wide Web; WWW 2008, Beijing, China, Apr. 21-25, 2008; pp. 1083-1084.

Chinese Office Action for Application 200910171570.6 dated Sep. 21, 2012 (English translation and full Chinese text).

Scott McNulty "Review: VirusBarrier X5," dated Jul. 8, 2008.

* cited by examiner

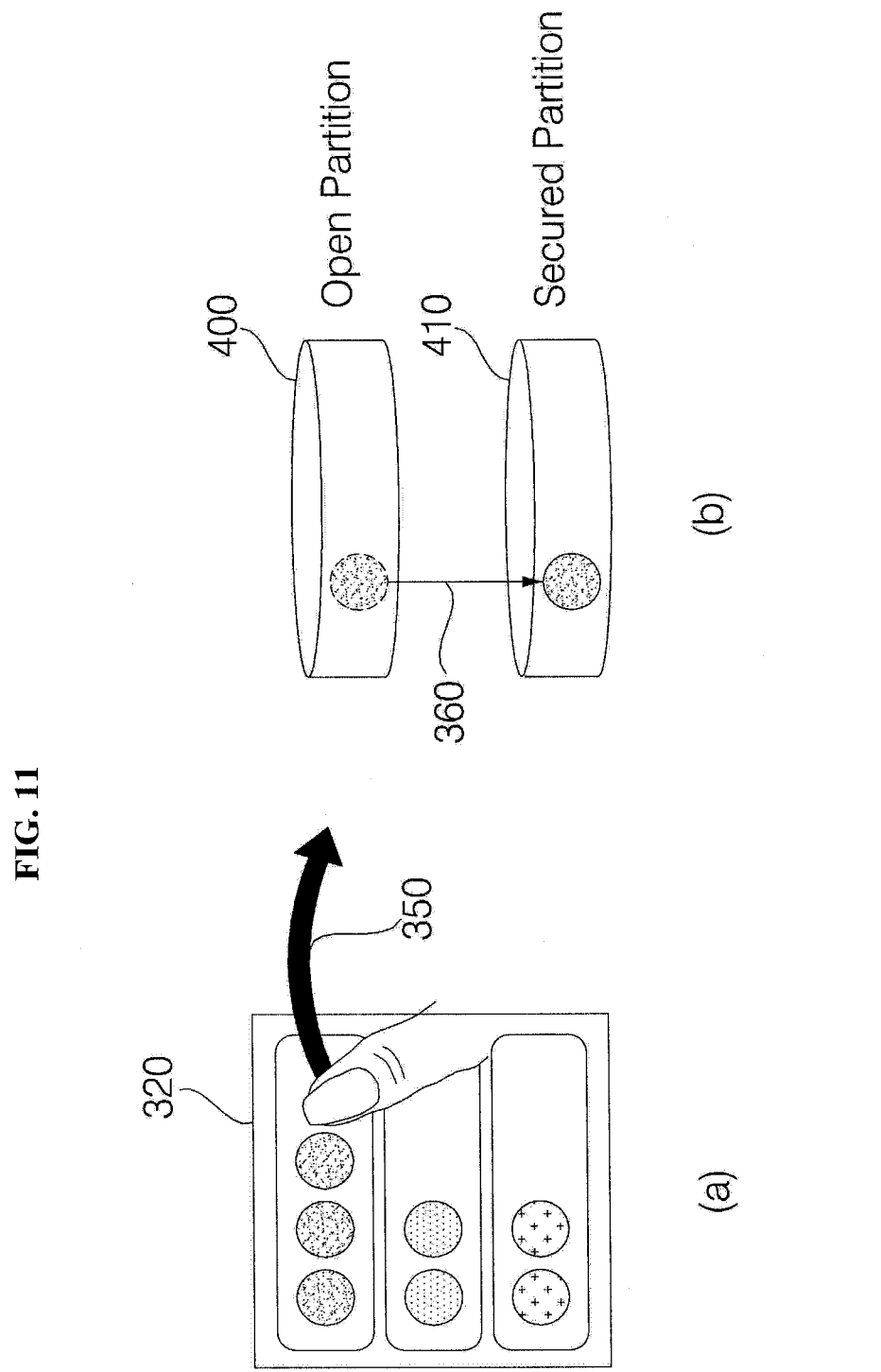

MOBILE TERMINAL TO PREVENT VIRUS INFECTION AND METHOD OF CONTROLLING OPERATION OF THE MOBILE TERMINAL

This application claims priority from Korean Patent Application No. 10-2008-0086445, filed Sep. 2, 2008, the subject matter of which is incorporated herein by reference.

BACKGROUND

1. Field

Embodiments of the present invention may relate to a mobile terminal and preventing the mobile terminal from being infected with viruses based on properties of the mobile terminal.

2. Background

Mobile terminals are portable devices that can provide users with various services such as a voice calling service, a video calling service, an information input/output service, and a data storage service.

As the types of services provided by mobile terminals diversify, an increasing number of mobile terminals have been equipped with various functions such as capturing photos or moving pictures, playing music files or moving image files, providing game programs, receiving broadcast programs and/or providing wireless Internet services and have thus evolved into multimedia players.

Various attempts have been made to realize such complicated functions using hardware devices or software programs. For example, various user interface (UI) environments have been developed in which users are allowed to easily search for and choose desired functions.

As functions of mobile terminals become complex and diversify, mobile terminals have become more prone to various viruses. The types of viruses have also rapidly grown.

Virus protection methods may be personal computer (PC)-based and may be characterized by detecting any suspicious operations such as an attempt to access a file system and/or the Internet. Some mobile terminal-based virus protection methods are available. However, mobile terminal-based virus protection methods may be characterized by performing simple virus scans and thus may not properly protect mobile terminals against viruses and reduce damage to mobile terminals caused by viruses.

Existing PC-based virus protection methods may not properly reflect properties of mobile terminals and may thus fail to properly handle various viruses associated with, for example, connection of voice and/or video calls, transmission of messages or access to a network such as a wireless local area network (WLAN) through Bluetooth and to actively minimize damage to mobile terminals caused by such viruses.

BRIEF DESCRIPTION OF THE DRAWINGS

Arrangements and embodiments may be described in detail with reference to the following drawings in which like reference numerals refer to like elements and wherein:

FIGS. 7 through 11 illustrate diagrams for explaining methods of the first through third example embodiments.

DETAILED DESCRIPTION

Embodiments of the present invention may provide a mobile terminal and a method of controlling operation of the mobile terminal that can effectively detect attempts to infect the mobile terminal based on the properties of the mobile terminal and may thus minimize damage to the mobile terminal.

A method of controlling operation of a mobile terminal may include outputting a sensing signal corresponding to the detected attempt if an attempt to make a call is detected, connecting the call if user input indicates that the mobile terminal is to connect the call, and shutting down the detected attempt if the user input indicates that the mobile terminal is not allowed to connect the call.

A mobile terminal may include a wireless communication unit configured to connect a call, and a controller configured to detect an attempt to connect a call from the wireless communication unit, to output a sensing signal corresponding to the detected attempt, to determine based on user input whether the mobile terminal is to connect the call, and either connect the call or shut down the detected attempt based on a result of the determination.

A method of controlling operation of a mobile terminal may include detecting a suspicious operation (or abnormal operation) that may have been caused by a virus, shutting down the suspicious operation and saving a file responsible for the suspicious operation in a quarantine area. The method may also include performing a virus scan on the file, classifying the file based on a result of the virus scan and displaying an icon indicating results of the classification in a quarantine display window.

A mobile terminal may include a display module, a memory configured to have a quarantine area, and a controller configured to detect a suspicious operation that may have been caused by a virus, to shut down the suspicious operation, to save a file responsible for the suspicious operation in a quarantine area, to perform a virus scan on the file, to classify the file based on a result of the virus scan and to display an icon indicating the results of the classification on the display module.

A mobile terminal may be a mobile phone, a smart phone, a laptop computer, a digital broadcast receiver, a personal digital assistant (PDA), a portable multimedia player (PMP), and/or a navigation device. The terms 'module' and 'unit' may be used interchangeably.

Figure 1:
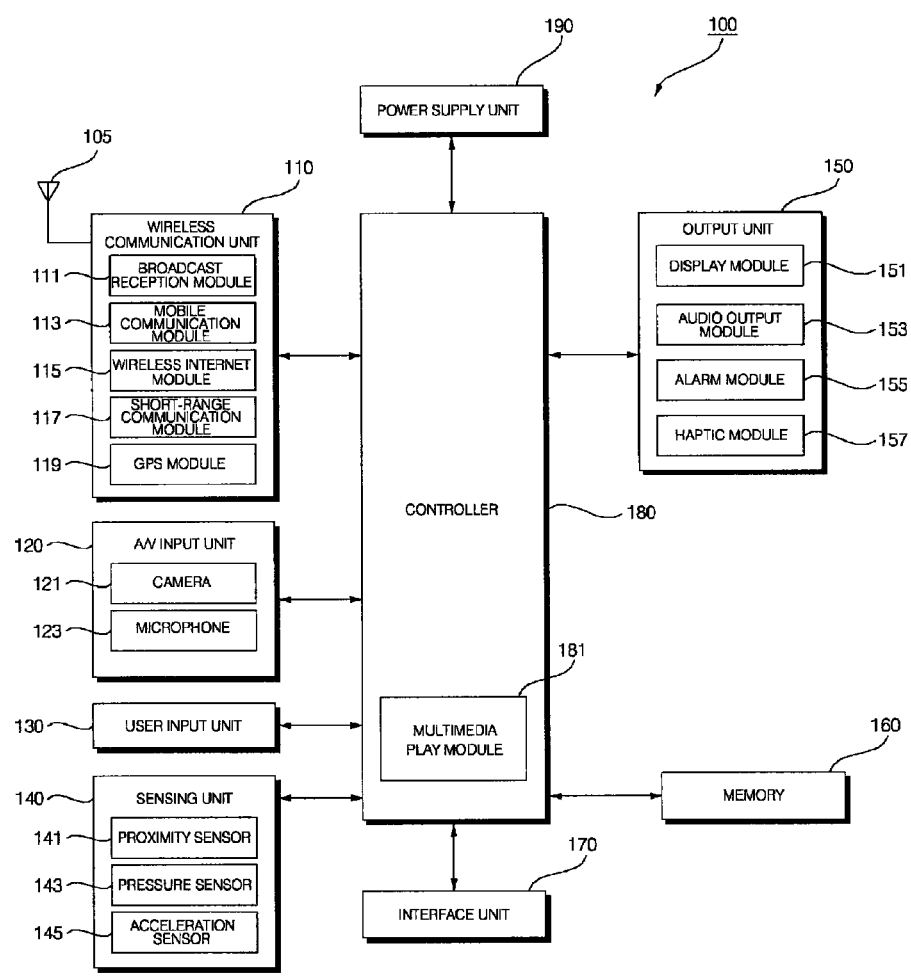
FIG. 1 illustrates a block diagram of a mobile terminal according to an example embodiment.

FIG. 1 illustrates a block diagram of a mobile terminal according to an example embodiment. Other embodiments and arrangements may also be used. As shown in FIG. 1, a mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, and/or some of the wireless communication unit 110, the A/V input unit 120, the user input unit 130, the sensing unit 140, the output unit 150, the memory 160, the interface unit 170, the controller 180, and/or the power supply unit 190 may be divided into two or more smaller units.

The wireless communication unit 110 may include a broadcast reception module 111, a mobile communication module 113, a wireless Internet module 115, a short-range communication module 117, and/or a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server that generates broadcast signals and/or broadcast-related information and transmits the generated broadcast signals and/or the generated broadcast-related information or may be a server that receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, a combination of a data broadcast signal and a TV broadcast signal or a combination of a data broadcast signal and a radio broadcast signal. The broadcast-related information may be provided to the mobile terminal 100 through a mobile communication network. The broadcast-related information may be received by the mobile communication module 113, rather than by the broadcast reception module 111. The broadcast-related information may come in various forms. For example, the broadcast-related information may be an electronic program guide (MPG) of digital multimedia broadcasting (DMB) or may be an electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and/or integrated services digital broadcast-terrestrial (ISDB-T). The broadcast reception module 111 may be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receive wireless signals from at least one of a base station, an external terminal, and a server through a mobile communication network. The wireless signals may include various types of data according to whether the mobile terminal 100 transmits/receives voice call signals, video call signals, and/or text/multimedia messages.

The wireless Internet module 115 may wirelessly access the Internet. The wireless Internet module 115 may be embedded in the mobile terminal 100 or may be installed in an external device. The wireless Internet module 115 may use various wireless Internet techniques such as wireless fidelity (WiFi), wireless broadband (Wibro), world interoperability for microwave access (Wimax) and/or high-speed downlink Packet Access (HSDPA).

The short-range communication module 117 may be for short-range communication. The short-range communication module 117 may use various short-range communication techniques such as Bluetooth, radio frequency identification (RFID), infrared data association (IrDA), ultra wideband (UWB), and/or ZigBee.

The GPS module 119 may receive position information from a plurality of GPS satellites.

The A/V input unit 120 may receive audio signals and/or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151 (or a display).

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, and/or a voice recognition mode with use of a microphone and may convert sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms (or noise canceling algorithms) to remove or reduce noise that may be generated during reception of external sound signals.

The user input unit 130 may generate key input data based on user input for controlling operation of the mobile terminal 100. The user input unit 130 may be implemented as a keypad, a dome switch, a touch pad (static pressure/static voltage), a jog wheel, and/or a jog switch. In particular, if the user input unit 130 is implemented as a touch pad and forms a layer structure together with the display module 151, the user input unit 130 and the display module 151 may be collectively referred to as a touch screen.

The sensing unit 140 may determine a current state of the mobile terminal 100 such as whether the mobile terminal 100 is opened up or closed, a position of the mobile terminal 100 and whether the mobile terminal 100 is placed in contact with a user, and generate a sensing signal for controlling operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and an acceleration sensor 145. The proximity sensor 141 may determine whether there is an entity nearby and that approaches the mobile terminal 100 without any mechanical contact with the entity. More specifically, the proximity sensor 141 may detect an entity that is nearby and approaching by detecting a change in an alternating magnetic field or a rate of change of static capacitance. The sensing unit 140 may include two or more proximity sensors 141.

The pressure sensor 143 may determine whether pressure is being applied to the mobile terminal 100 and may detect a magnitude of pressure applied to the mobile terminal 100. The pressure sensor 143 may be provided in a portion of the mobile terminal 100 in which the detection of pressure is necessary. For example, the pressure sensor 143 may be provided in the display module 151. The display module 151 may differentiate a typical touch input from a pressure touch input that is generated by applying greater pressure than the pressure used to generate a typical touch input based on a signal output by the pressure sensor 143. The magnitude of pressure applied to the display module 151 may be determined upon receiving a pressure touch input based on the signal output by the pressure sensor 143.

Acceleration sensors are a type of device for converting an acceleration variation into an electric signal. With recent developments in micro-electromechanical system (MEMS) technology, acceleration sensors may be widely used in various products for various purposes. For example, an acceleration sensor may be provided in an airbag system for an automobile and may thus detect collisions. Alternatively, an acceleration sensor may be used as an input device for a computer game and may sense motion of a human hand during a computer game. Two or three acceleration sensors 145 representing different axial directions may be provided in the mobile terminal 100. Alternatively, only one acceleration sensor 145 representing a Z axis may be provided in the mobile terminal 100.

The output unit 150 may output audio signals, video signals and/or alarm signals. The output unit 150 may include the display module 151 (or display), an audio output module 153, an alarm module 155 and a haptic module 157.

The display module 151 may display various information processed by the mobile terminal 100. For example, if the mobile terminal 100 is in a call mode, the display module 151 may display a user interface (UI) and/or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 together form a layer structure and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached to the exterior of the mobile terminal 100 and may be connected to an internal bus of the mobile terminal 100. The touch screen panel may monitor whether the touch screen panel is being touched by the user. Once a touch input to the touch screen panel is detected, the touch screen panel may transmit a number of signals corresponding to the touch input to the touch screen panel controller. The touch screen panel controller may process the signals transmitted by the touch screen panel, and transmit the processed signals to the controller 180. The controller 180 may determine whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and/or excellent visual properties. E-paper may be implemented on any type of substrate such as plastic, metallic or paper substrate and may maintain an image displayed thereon even when power is turned off. In addition, e-paper may reduce a power consumption of the mobile terminal 100 because it does not require a backlight assembly. The display module 151 may be implemented as e-paper by using electrostatic-charged hemispherical twist balls, using electrophoretic deposition, and/or using microcapsules.

The display module 151 may include at least one of a liquid crystal display (LCD), a thin film transistor (TFT)-LCD, an organic light-emitting diode (OLED), a flexible display, and/or a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, and/or a broadcast reception mode or may output audio data present in the memory 160. In addition, the audio output module 153 may output various sound signals associated with functions of the mobile terminal 100 such as receiving a call or a message. The audio output module 153 may include a speaker and/or a buzzer.

The alarm module 155 may output an alarm signal indicating an occurrence of an event in the mobile terminal 100. Examples of the event may include receiving a call signal, receiving a message, and/or receiving a key signal. Examples of the alarm signal output by the alarm module 155 may include an audio signal, a video signal and/or a vibration signal. More specifically, the alarm module 155 may output a signal upon receiving a call signal or a message. In addition, the alarm module 155 may receive a key signal and may output a signal as feedback to the key signal. Therefore, the user may determine whether an event has occurred based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibrations) that can be perceived by the user. If the haptic module 157 generates a vibration as a haptic effect, an intensity and a pattern of vibration generated by the haptic module 157 may be altered in various manners. The haptic module 157 may synthesize different vibration effects and may output a result of the synthesization. Alternatively, the haptic module 157 may sequentially output different vibration effects.

The haptic module 157 may provide various haptic effects other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and/or a haptic effect obtained by realizing a sense of heat or cold using a device capable of absorbing heat or generating heat. The haptic module 157 may enable the user to recognize a haptic effect using a kinesthetic sense of the fingers or the arms. The mobile terminal 100 may also include two or more haptic modules 157.

The memory 160 may store various programs necessary for operation of the controller 180. In addition, the memory 160 may temporarily store various data such as a phonebook, messages, still images and/or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage that performs functions of the memory 160 on the Internet.

The interface unit 170 may interface with an external device that can be connected to the mobile terminal 100. The interface unit 170 may be a wired/wireless headset, an external battery charger, a wired/wireless data port, a card socket for a memory card, a subscriber identification module (SIM) card or a user identity module (UIM) card, an audio input/output (I/O) terminal, a video I/O terminal, or an earphone, for example. The interface unit 170 may receive data from an external device or may be powered by an external device. The interface unit 170 may transmit data provided by an external device to other components in the mobile terminal 100 or may transmit data provided by other components in the mobile terminal 100 to an external device.

If the mobile terminal 100 is connected to an external cradle, power may be supplied from the external cradle to the mobile terminal 100 through the interface unit 170, and various command signals may be transmitted from the external cradle to the mobile terminal 100 through the interface unit 170.

The controller 180 may control operations of the mobile terminal 100. For example, the controller 180 may perform various control operations regarding making/receiving a voice call, transmitting/receiving data, and/or making/receiving a video call. The controller 180 may include a multimedia play module 181 that plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to other components in the mobile terminal 100.

The mobile terminal 100 may include a wired/wireless communication system and a satellite-based communication system. The mobile terminal 100 may operate in a communication system transmitting data as frames or packets.

The exterior of the mobile terminal 100 may hereafter be described with reference to FIGS. 2 and 3. For ease of convenience, the mobile terminal 100 is described as a slider-type mobile terminal equipped with a touch screen. However, embodiments of the present invention are not restricted to a slider-type mobile terminal. Embodiments of the present invention may be applied to various mobile phones other than a slider-type mobile terminal.

Figure 2:
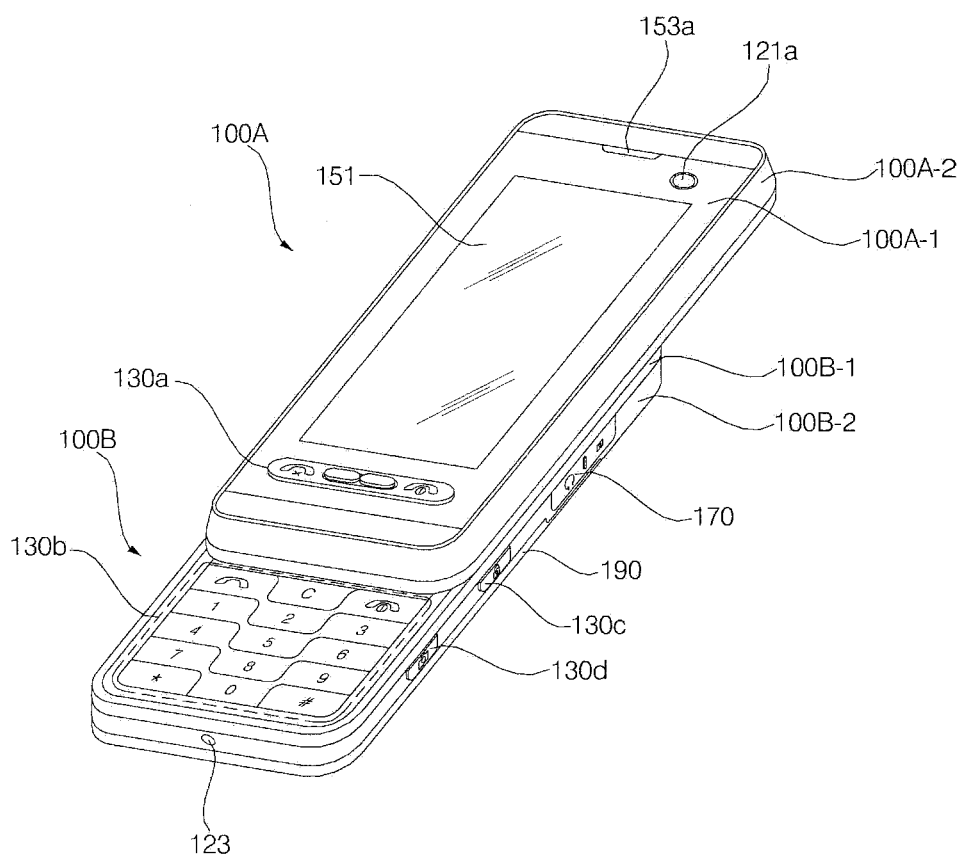
FIG. 2 illustrates a front perspective view of the mobile terminal shown in FIG. 1.

FIG. 2 illustrates a front perspective view of the mobile terminal 100 shown in FIG. 1. As shown in FIG. 2, the mobile terminal 100 may include a first body 100A and a second body 100B. The first and second bodies 100A and 100B may be configured to slide up and down relative to each other.

When the mobile terminal 100 is closed, the first body 100A and the second body 100B may overlap each other. When the mobile terminal 100 is open as shown in FIG. 2, the second body 100B may be at least partially exposed below the first body 100A.

When the mobile terminal 100 is closed, the mobile terminal 100 may operate in a standby mode and may be released from the standby mode in response to user manipulation. When the mobile terminal 100 is open, the mobile terminal 100 may operate in a call mode and may be switched to the standby mode either manually in response to user manipulation or automatically after lapse of a predefined amount of time.

The exterior of the first body 100A may be defined by a first front case 100A-1 and a first rear case 100A-2. Various electronic devices may be provided in the space formed by the first front case 100A-1 and the first rear case 100A-2. At least one intermediate case may be additionally provided between the first front case 100A-1 and the first rear case 100A-2. The first front case 100A-1 and the rear case 100A-2 may be formed of a synthetic resin through injection molding. Alternatively, the first front case 100A-1 and the rear case 100A-2 may be formed of a metal such as stainless steel (STS) or titanium (Ti).

The display module 151, a first audio output module 153a, a first camera 121a and a first user input unit 130a may be provided in the first front case 100A-1.

The display module 151 may include an LCD and an OLED that can visualize information. A touch pad may overlap the display module 151 and thus form a layer structure. The display module 151 may therefore serve as a touch screen. Various information may be input to the mobile terminal 100 by simply touching the display module 151.

The first audio output module 153a may be implemented as a receiver or a speaker. The first camera 121a may capture a still image or a moving image of the user.

The exterior of the second body 100 may be defined by a second front case 100B-1 and a second rear case 100B-2. A second user input unit 130b may be provided at a front of the second front case 100B-1. Third and fourth user input units 130c and 130d, the microphone 123 and the interface unit 170 may be provided in the second front case 100B-1 or the second rear case 100B-2.

The first through fourth user input units 130a through 130d may be collectively referred to as the user input unit 130. The user input unit 130 may adopt various manipulation methods as long as the user input unit 130 can offer tactile feedback to the user.

For example, the user input unit 130 may be implemented as a dome switch or a touch pad that receives a command or information upon being pushed or touched by the user. Alternatively, the user input unit 130 may be implemented as a wheel, a jog dial, and/or a joystick.

The first user input unit 130a may allow the user to input commands such as 'start', 'end', and 'scroll'. The second user input unit 130b may also be used to input numerals, characters or symbols. The third and fourth user input units 130c and 130d may be used as hot keys for activating certain functions of the mobile terminal 100.

The microphone 123 may receive a voice of the user or other sounds.

The power supply unit 190 may supply power to the mobile terminal 100 and may be provided in the second rear case 100B-2. The power supply unit 190 may be a rechargeable battery and/or may be coupled to the second body 100B so as to be attachable to or detachable from the second body 100B.

Figure 3:
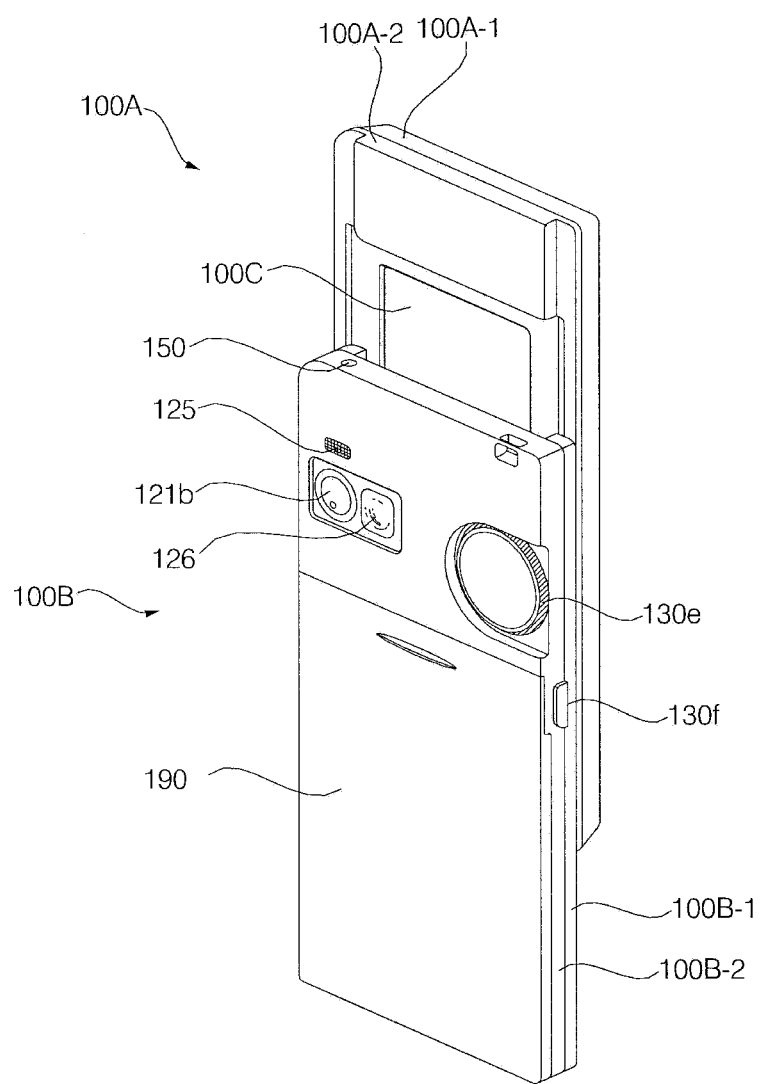
FIG. 3 illustrates a rear perspective view of the mobile terminal shown in FIG. 1.

FIG. 3 illustrates a rear perspective view of the mobile terminal 100 shown in FIG. 2. As shown in FIG. 3, a fifth user input unit 130e and a second camera 121b may be provided at the rear of the second rear case 100B-2 of the second body 100B. The fifth user input unit 130e may be of a wheel type. A sixth user input unit 130f may be provided on one side of the second body 100B.

The second camera 121b may have a photographing direction that is different from a photographing direction of the first camera 121a shown in FIG. 2. Additionally, the first camera 121a and the second camera 121b may have different resolutions. For example, the first camera 121a may capture and then transmit an image of a face of the user during a video call. Thus, a low-resolution camera may be used as the first camera 121a. The second camera 121b may capture an image of an ordinary subject. The image captured by the second camera 121b may not need to be transmitted. Thus, a high-resolution camera may be used as the second camera 121b.

A camera flash 125 and a mirror 126 may be provided near the second camera 121b. The camera flash 125 may illuminate a subject when the second camera 121b captures an image of the subject. The user may look in the mirror and prepare himself or herself for taking a self shot.

A second audio output module (not shown) may be additionally provided in the second rear case 100B-2. The second audio output module may provide a stereo function along with the first audio output module 153a. The second audio output module may also be used during a speaker-phone mode.

An antenna (not shown) for receiving a broadcast signal may be provided on one side of the second rear case 100B-2. The antenna may be installed so as to be able to extend out from the second rear case 100B-2. A slide module 100C may be provided between the first body 100A and the second body 100B and may couple the first body 100A and the second body 100B so as to slide up and down relative to each other. As shown in FIG. 3, when the mobile terminal 100 is open, part of the slide module 100C may be exposed on the first rear case 100A-2 of the first body, and the rest of the slide module 100C may be hidden by the second front case 100B-1 of the second body 100B.

The second camera 121b and the fifth and sixth user input units 130e and 130f are shown in FIG. 3 as being provided on the second body 100B, however embodiments are not limited to this configuration. For example, at least one of the second camera 121b and the fifth and sixth user input units 130e and 130f may be mounted on the first body 100A, and more particularly on the first rear case 100A-2. In this case, whichever of the second camera 121b and the fifth and sixth user input units 130e and 130f are mounted on the first rear case 100A-2 may be protected by the second body 100B.

The first camera 121a may be rotatable and thus may cover the photographing direction of the second camera 121b. The second camera 121b may be provided.

The power supply unit 190 may be provided in the first rear case 100A-2. The power supply unit 190 may be a rechargeable battery and may be coupled to the first rear case 100A-2 so as to be attachable to or detachable from the first rear case 100A-2.

Figure 4:
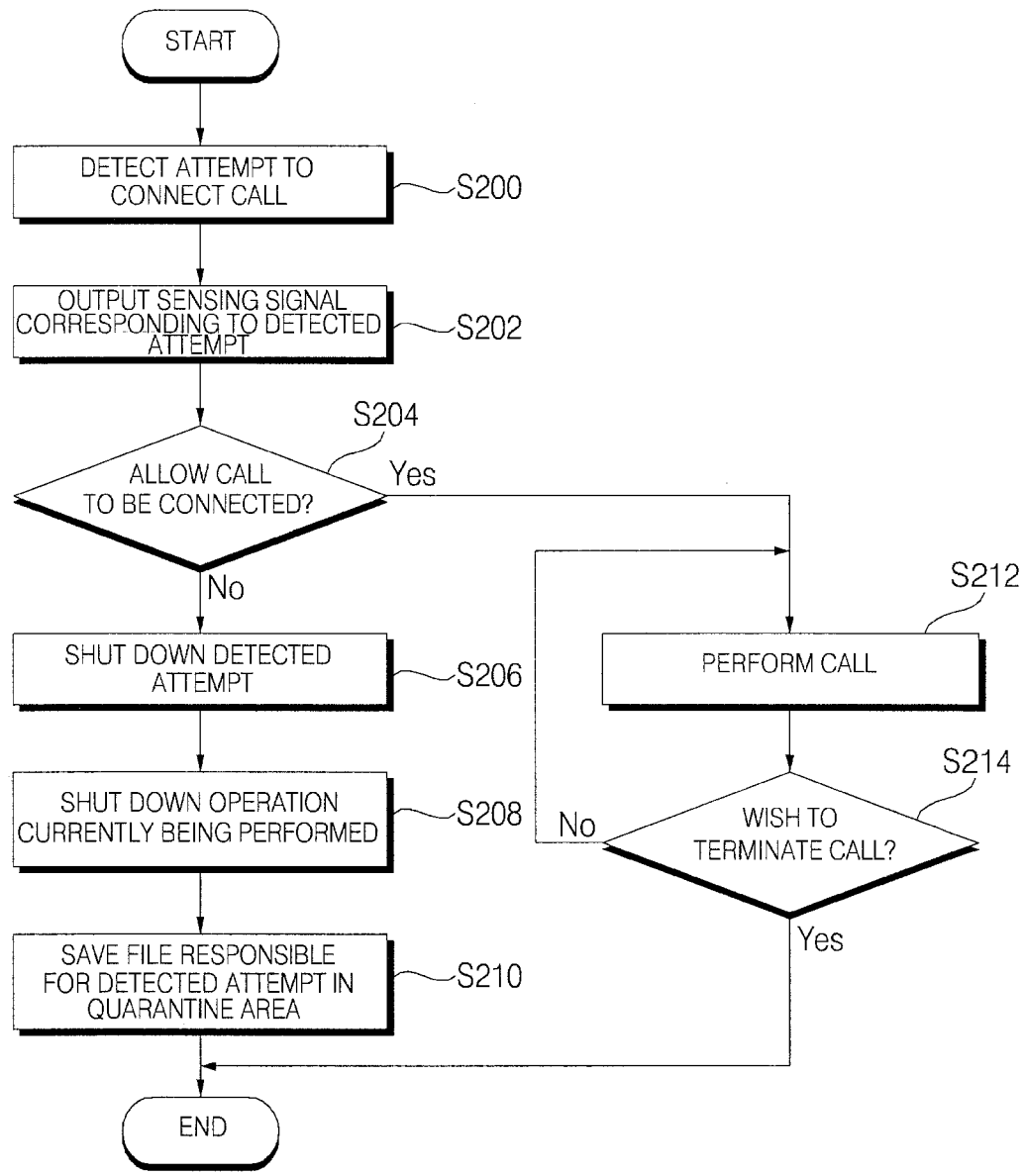
FIG. 4 illustrates a flowchart of a method of controlling operation of a mobile terminal according to a first example embodiment of the present invention.

FIG. 4 illustrates a flowchart of a method of controlling operation of a mobile terminal according to a first example embodiment of the present invention. Other embodiments, operations and orders of operations are also within the scope of the present invention.

As shown in FIG. 4, if an attempt to connect a call (such as an international call) is detected in operation S200, the controller 180 may output a sensing signal corresponding to the detected attempt in operation S202 based on a consideration that a virus may have infiltrated into the mobile terminal 100 and may arbitrarily execute long-distance calls such as international calls. The controller 180 may output an on-screen display (OSD) message, an audio signal and/or a haptic effect. For example, the controller 180 may display a message using a popup window or a semitransparent window during a video call (or video conference). Alternatively, the controller 180 may output a vibration during a voice call.

The user may decide whether to permit the attempt to connect a call. If the user decides to permit the attempt to connect the call in operation S204, the controller 180 may connect a long-distance call and enable the user to engage in the long-distance call in operation S212 until the user wishes to terminate the long-distance call in operation S214.

On the other hand, if the user decides not to permit the attempt to connect the call in operation S204, the controller 180 may shut down the attempt to connect the call in operation S206 and may shut down an operation currently being performed in operation S208. The controller 180 may therefore deny the attempt to make the call. The controller 180 may save a file responsible for the attempt that was detected (in operation S200) in a quarantine area in operation S210 so that the file can be subjected to final inspection during a quarantine inspection mode. The saved data may be information that caused the attempt to make the call.

A long-distance call may therefore be prevented from being arbitrarily connected due to a potential virus infection. This may also prevent a spread of viruses during a voice call, a video call (or video conference) and/or a messaging.

Figure 5:
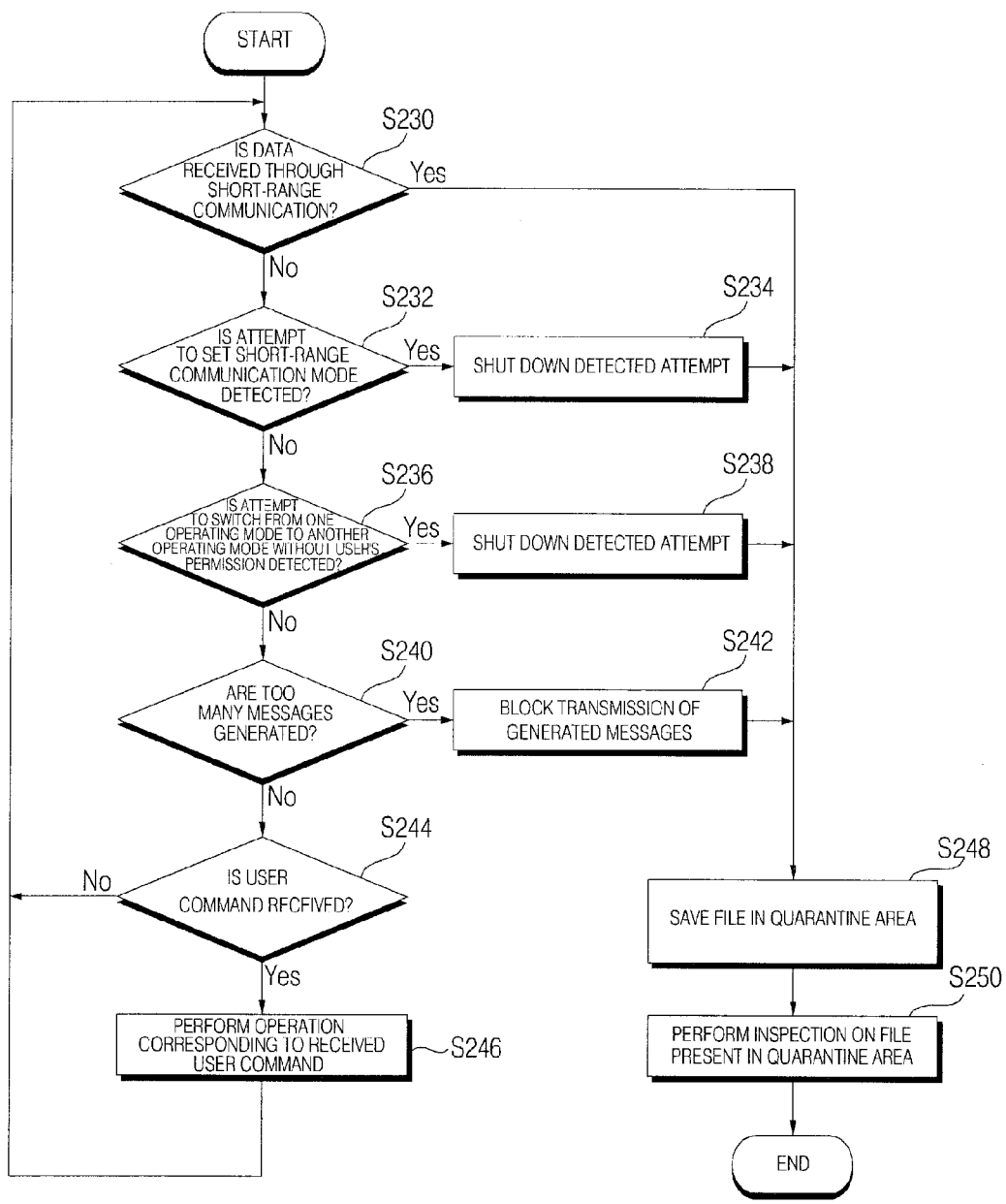
FIG. 5 illustrates a flowchart of a method of controlling operation of a mobile terminal according to a second example embodiment of the present invention.

FIG. 5 illustrates a flowchart of a method of controlling operation of a mobile terminal according to a second example embodiment of the present invention. Other embodiments, operations and orders of operation are also within the scope of the present invention. As shown in FIG. 5, if data such as a Bluetooth message or a Downloadable Widget is received through Bluetooth- or wireless local area network (WLAN)-based short-range communication in operation S230, the controller 180 may save a file (or information) responsible for receipt of the data in a quarantine area in operation S248.

If an attempt to set a short-range communication mode (such as a Bluetooth mode) is detected in operation S232, the controller 180 may shut down (or deny) the attempt to set the short-range communication mode in operation S234. The controller 180 may save a file responsible for the attempt detected in operation S232 in the quarantine area in operation S248. The controller 180 may detect a suspicious operation, such as an attempt to perform a short-range communication, such as a Bluetooth communication, without a direct input from a user.

If an attempt is detected in operation S236 to arbitrarily switch the mobile terminal 100 from one operating mode to an operating mode without a user's permission, the controller 180 may shut down the detected attempt in operation S238. For example, the attempts to switch modes may include an attempt to arbitrarily change alarm settings, morning-call settings or ringtone settings or release the mobile terminal 100 from a manner mode with no key or touch input received. The controller 180 may save a file responsible for the detected attempt in the quarantine area in operation S248.

If more messages than a prescribed reference level are generated within a predetermined amount of time in operation S240, the controller 180 may block transmission of the generated messages in operation S242. The controller 180 may save a file responsible for the generated messages in the quarantine area in operation S248. That is, if too many short message service (SMS) messages are generated within a short period of time, the controller 180 may suspect that the mobile terminal 100 is infected (i.e., detect a suspicious operation). The controller 180 may block transmission of messages and may determine whether the mobile terminal 100 is infected. The controller 180 may perform advance monitoring in order to properly detect and handle various attacks launched by unknown viruses and suspicious operations (or abnormal operations) such as an attempt to arbitrarily make a call or leak personal information.

If a normal user command is received in operation S244, then the controller 180 may control an operation corresponding to the received user command to be performed in operation S246. The file present in the quarantine area may be subjected to final inspection during a quarantine inspection mode in operation S250.

If a suspicious operation is detected (based on a suspicion of a virus), then the suspicious operation may be shut down (or denied further use), and a file responsible for the suspicious operation may be quarantined and then subjected to a virus scan (i.e., an inspection).

Figure 6:
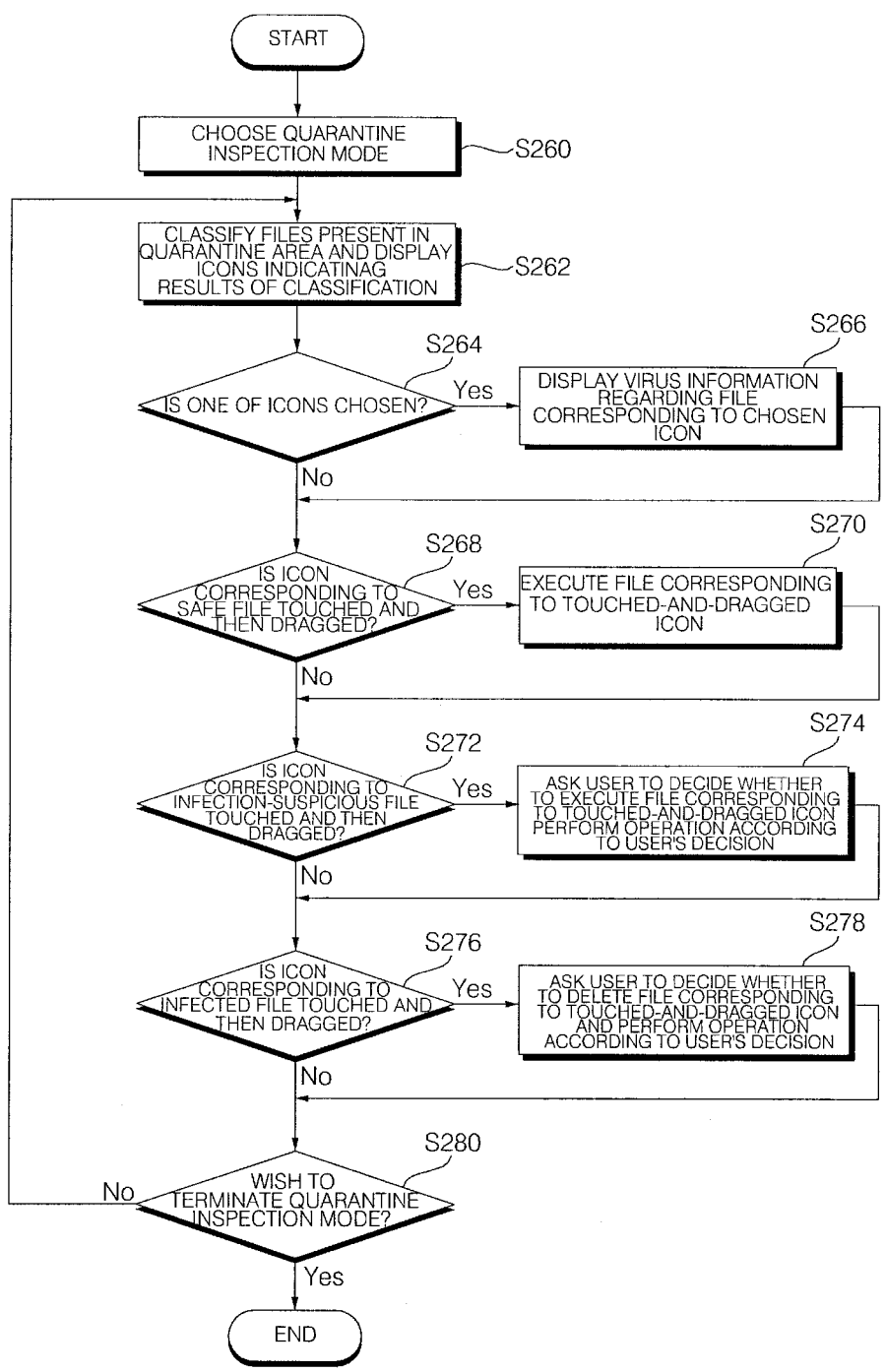
FIG. 6 illustrates a flowchart of a method of controlling operation of a mobile terminal according to a third example embodiment of the present invention.

FIG. 6 illustrates a flowchart of a method of controlling operation of a mobile terminal according to a third example embodiment of the present invention. Other embodiments, operations and orders of operation are also within the scope of the present invention.

As shown in FIG. 6, if a quarantine inspection mode is chosen based on a user command in operation S260, the controller 180 may classify, in operation S262, files present in a quarantine area and may display icons indicating results of the classification in a quarantine inspection window displayed on the display module 151. More specifically, the controller 180 may perform a virus scan on files present in the quarantine area and may then classify the corresponding files as being a safe file, and infection-suspicious file and/or an infected file.

If an icon corresponding to an infection-suspicious file or an infected file is chosen from the quarantine inspection window in operation S264, then the controller 180 may display virus information regarding the infection-suspicious file or the infected file in operation S266.

If an icon corresponding to a safe file is chosen from the quarantine inspection window and is then dragged out of (or copied or moved from) the quarantine inspection window in operation S268, then the controller 180 may execute the safe file in operation S270. If the file corresponding to the icon chosen in operation S268 can not be readily executed, then the controller 180 may move the corresponding file to an area in which files classified as not safe are stored.

If an icon corresponding to an infection-suspicious file is chosen from the quarantine inspection window and is then dragged out of (or copied or moved from) the quarantine inspection window in operation S272, then the controller 180 may allow the user to decide whether to execute the infection-suspicious file and may perform an operation based on the user's decision. The controller 180 may display a message asking the user to decide whether to execute the file corresponding to the chosen icon in operation S274. Thereafter, if the user chooses to execute the file corresponding to the chosen icon, then the controller 180 may execute the corresponding file. On the other hand, if the user chooses not to execute the file corresponding to the chosen icon, then the controller 180 may continuously quarantine the file in the quarantine area. The controller 180 may display a message asking the user to decide whether to report the file corresponding to the chosen icon to an antivirus software provider and/or whether to delete the file corresponding to the chosen icon and the controller 180 may perform an operation according to the user's decision.

If an icon corresponding to an infected file is chosen from the quarantine inspection window and is then dragged out of (or copied or moved from) the quarantine inspection window in operation S276, then the controller 180 may request the user to decide whether to delete the infected file and perform an operation based on the user's decision in operation S278. The controller 180 may display a message asking the user to decide whether to delete the file corresponding to the chosen icon. If the user chooses to delete the file corresponding to the chosen icon, then the controller 180 may delete the corresponding file. On the other hand, if the user chooses not to delete the file corresponding to the chosen icon, then the controller 180 may continuously quarantine the corresponding file in the quarantine area. The controller 180 may also display a message asking the user to decide whether to report the file corresponding to the chosen icon to an antivirus software provider and then perform an operation according to the user's decision.

Embodiments may therefore classify files present in the quarantine area and results of the classification may be displayed in a quarantine inspection window. Various operations based on whether the files are safe may be formed and then dragged out of (or moved from) the quarantine inspection window.

FIGS. 7 through 11 illustrate diagrams for explaining methods of the first through third example embodiments.

Figure 7:
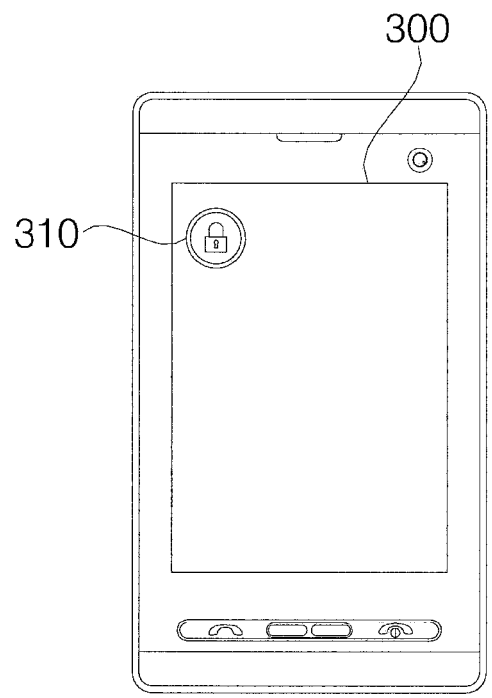
Figure 8:
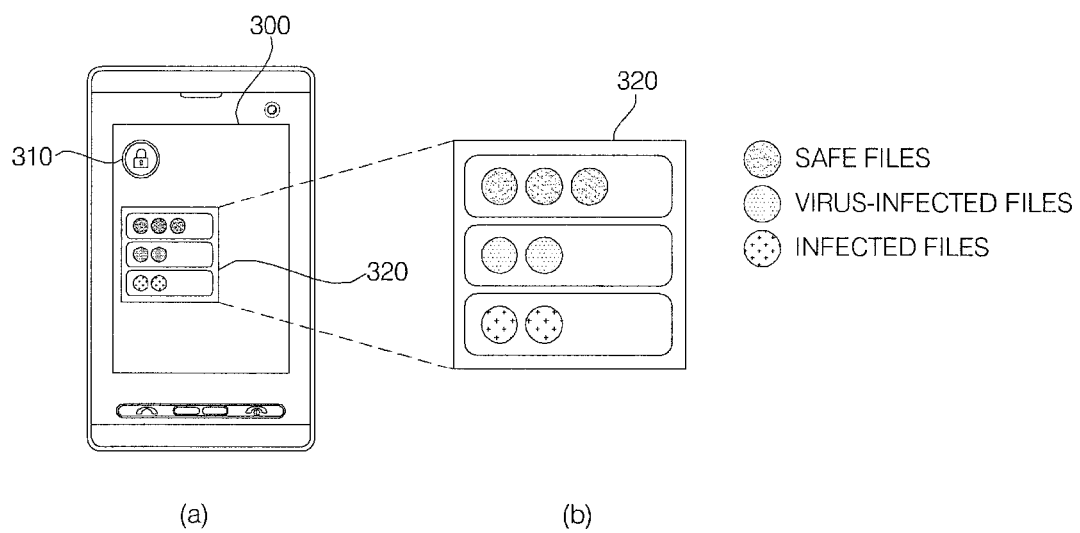

As shown in FIG. 7, an icon 310 for choosing a quarantine inspection mode may be displayed on an idle screen 300. As shown in FIG. 8, if the icon 310 is chosen by being touched, a quarantine inspection window 320 may be displayed. A plurality of icons representing safe files, infection-suspicious files and/or infected files may be displayed in the quarantine inspection window 320.

Figure 9:
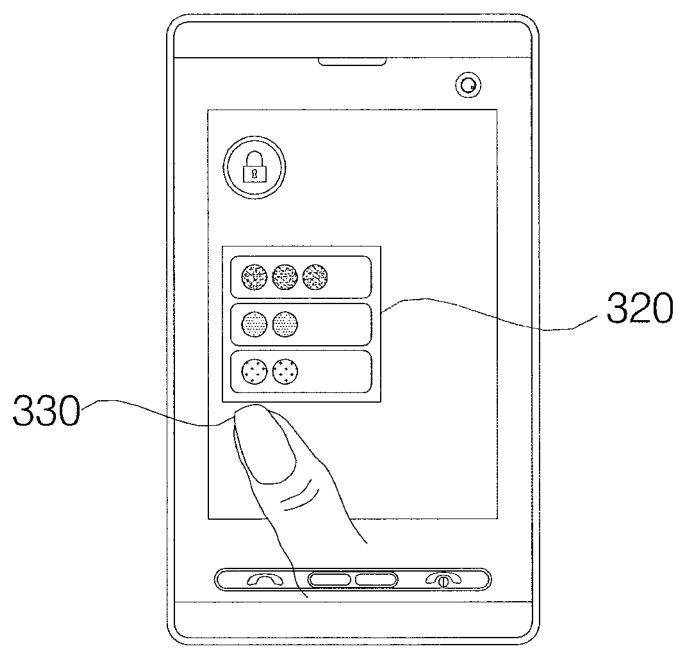
Figure 10:
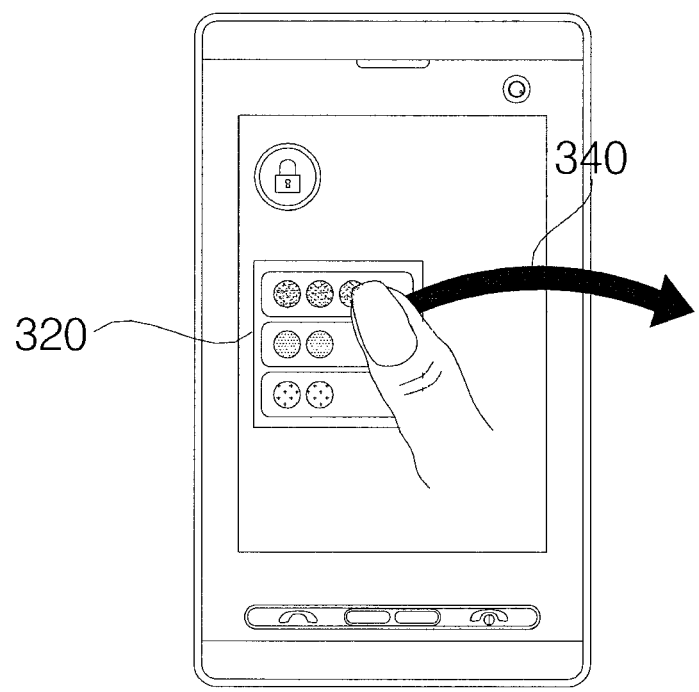

As shown in FIG. 9, if one of the icons displayed in the quarantine inspection window 320 is chosen by being touched or approached as indicated by reference numeral 330, then virus information regarding a file corresponding to the chosen icon may be displayed. As shown in FIG. 10, if one of the icons displayed in the quarantine inspection window 320 is touched and then dragged out of (or copied or moved from) the quarantine inspection window 320, as shown by reference numeral 340, then an operation may be performed according to whether a file corresponding to the moved icon is a safe file.

As shown in FIG. 11, if an icon corresponding to a safe file is moved (or touched and dragged), as indicated by reference numeral 350, then the file may be executed. Thereafter, the file may be moved, as shown by arrow 360, from an open partition 400 where files are quarantined to a secure partition 410 where safe files are stored.

The mobile terminal 100 may be effectively protected against various viruses by detecting an attempt, if any, to infect the mobile terminal 100 and quarantining a file responsible for the detected attempt. In the above described embodiments, suspicious operations, abnormal activity and/or an unusual event may be detected based on parameters/characteristics that are pre-stored in the mobile terminal 100. Embodiments of the mobile terminal and the method of controlling operations of the mobile terminal may not be restricted to the exemplary embodiments as set forth herein.

Embodiments may be applicable to the mobile terminal 100 determining that a Bluetooth communication is attempting to be made without a user directly enabling the Bluetooth operation. In such an embodiment, the controller may disable the Bluetooth operation until a determination may be made, as described above.

Embodiments may be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium may be distributed over a plurality of computer systems connected to a network so that computer-readable code is written thereto and executed therefrom in a decentralized manner. Functional programs, code, and code segments needed for realizing the present invention may be easily construed by one of ordinary skill in the art.

As described above, damage to a mobile terminal caused by viruses may be reduced by detecting an attempt to infect the mobile terminal, reporting the detected attempt to a user, and quarantining a file responsible for the detected attempt either automatically or manually in response to a user command.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a mobile terminal, the method comprising:
   detecting an attempt to set a short-range communication mode of the mobile terminal without input from a user;
   shutting down the detected attempt to set a short-range communication mode;
   saving, in a quarantine area a file corresponding to the attempt to set the short-range communication mode;
   detecting an attempt to switch from one operating mode to another operating mode without a user's permission;
   shutting down the detected attempt to switch from one operating mode to another operating mode;
   saving, in the quarantine area, a file corresponding to the attempt to switch from one operating mode to another operating mode;
   detecting that more than a predetermined number of messages are being generated at the mobile terminal;
   blocking transmission of messages from the mobile terminal when more than the predetermined number of messages are detected;
   saving, in the quarantine area, a file corresponding to the messages being generated;
   performing a virus scan on the plurality of saved files in the quarantine area;
   classifying each of the saved plurality of files into one of a safe file, an infection-suspicious file or an infected file based on a result of the performing of the virus scan;
   displaying a plurality of icons corresponding to the saved plurality of files in a quarantine display window, the plurality of icons being classified into three types of icons according to a type of the saved plurality of files;
   executing a predetermined operation according to a type of a file corresponding to a touched and dragged icon when one of the plurality of icons is touched and dragged out of the quarantine display window,
   wherein executing the predetermined operation comprises:
   executing a safe file when an icon corresponding to the safe file is touched and dragged out of the quarantine display window, displaying a message regarding whether to execute the infection-suspicious file when an icon corresponding to an infection-suspicious file is touched and dragged out of the quarantine display window, and displaying a message regarding whether to delete the infected file when an icon corresponding to an infected file is touched and dragged out of the quarantine display window.

2. The method of claim 1, further comprising displaying virus information regarding the infection-suspicious file or the infected file when an icon corresponding to the one of the infection-suspicious file or the infected file is selected by a user.

3. The method of claim 1, further comprising saving a newly-added file in the quarantine area.

4. The method of claim 1, further comprising displaying an icon corresponding to the file saved in the quarantine area during a quarantine inspection mode.

5. The method of claim 4, further comprising displaying an icon for choosing the quarantine inspection mode on an idle screen.

6. A mobile terminal comprising:
   a display;
   a memory that includes a quarantine area; and
   a controller configured to detect an attempt to set a short-range communication mode of the mobile terminal without input from a user, to shut down the detected attempt to set a short-range communication mode, and to save, in the quarantine area, a file corresponding to the attempt to set the short-range communication mode,
   the controller further configured to detect an attempt to switch from one operating mode to another operating mode without a user's permission, to shut down the detected attempt to switch from one operating mode to another operating mode, and to save, in the quarantine area, a file corresponding to the attempt to switch from one operating mode to another operating mode,
   the controller further configured to detect that more than a predetermined number of messages are being generated at the mobile terminal, to block transmission of messages from the mobile terminal when more than the predetermined number of messages are detected, and to save, in the quarantine area, a file corresponding to the number of messages being generated,
   the controller to perform a virus scan of saved plurality of files, and to classify each of the saved plurality of files into one of a safe file, an infection-suspicious file or an infected file based on a result of the virus scan,
   wherein the controller is further configured to display a plurality of icons corresponding to the saved files in a quarantine display window, the plurality of icons being classified into three types of icons according to a type of the saved files,
   wherein the controller is further configured to execute a predetermined operation according to a type of a file corresponding to a touched and dragged icon when one of the plurality of icons is touched and dragged out of the quarantine display window, and
   wherein the controller is further configured to execute a safe file when an icon corresponding to the safe file is touched and dragged out of the quarantine display window, to display a message regarding whether to execute the infection-suspicious file when an icon corresponding to an infection-suspicious file is touched and dragged out of the quarantine display window, and to display a message regarding whether to delete the infected file when an icon corresponding to an infected file is touched and dragged out of the quarantine display window.

7. The mobile terminal of claim 6, wherein the display displays virus information regarding the infection-suspicious file or the infected file when an icon corresponding to the one of the infection-suspicious file or the infected file is selected by a user.

8. The mobile terminal of claim 6, wherein the controller displays an icon corresponding to the file saved in the quarantine area during a quarantine inspection mode.

* * * * *